United States Patent
zur Loye et al.

(10) Patent No.: US 6,516,774 B2
(45) Date of Patent: Feb. 11, 2003

(54) PREMIXED CHARGE COMPRESSION IGNITION ENGINE WITH VARIABLE SPEED SOC CONTROL AND METHOD OF OPERATION

(75) Inventors: Axel O. zur Loye, Columbus, IN (US); Tim R. Frazier, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 09/850,188

(22) Filed: May 8, 2001

(65) Prior Publication Data

US 2002/0017269 A1 Feb. 14, 2002

Related U.S. Application Data

(60) Provisional application No. 60/202,850, filed on May 8, 2000.

(51) Int. Cl.$^7$ .................................................. F02B 3/00
(52) U.S. Cl. ................... 123/299; 123/305; 123/406.23
(58) Field of Search ............................. 123/299, 305, 123/319, 324, 406.11, 406.12, 406.23

(56) References Cited

U.S. PATENT DOCUMENTS

| | | |
|---|---|---|
| 3,924,598 A | 12/1975 | Davis |
| 4,768,481 A | 9/1988 | Wood |
| 4,924,828 A | 5/1990 | Oppenheim |
| 5,184,592 A | 2/1993 | Durbin et al. |
| 5,265,562 A | 11/1993 | Kruse |
| 5,392,745 A | 2/1995 | Beck |
| 5,535,716 A | 7/1996 | Sato et al. |
| 5,832,880 A | 11/1998 | Dickey |
| 6,026,781 A | 2/2000 | Imatake et al. |
| 6,058,905 A * | 5/2000 | Nagaishi et al. ............ 123/295 |
| 6,182,632 B1 * | 2/2001 | Yanagihara ................. 123/299 |
| 6,227,151 B1 | 5/2001 | Ma |
| 6,276,334 B1 | 8/2001 | Flynn et al. |
| 6,345,499 B1 * | 2/2002 | Nishimura et al. ......... 123/295 |
| 6,425,373 B1 * | 7/2002 | Robichaux et al. ..... 123/406.23 |

FOREIGN PATENT DOCUMENTS

| | | |
|---|---|---|
| DE | 198 18 596 A1 | 11/1999 |
| GB | 334018 | 8/1930 |

OTHER PUBLICATIONS

Shigeru Onishi et al., "Active Thermo–Atmosphere Combustion (ATAC)—A New Combustion Process for Internal Combustion Engines", SAE Technical Paper No. 790501, Feb. 26–Mar. 2, 1979.

Masaaki Noguchi et al., "A Study on Gasoline Engine Combustion by Observation of Intermediate Reactive Products during Combustion", SAE Technical Paper No. 790840, Sep. 10–13, 1979.

Paul M. Najt et al., "Compression–Ignited Homogeneous Charge Combustion", SAE Technical Paper No. 830264, (1983).

R.H. Thring, "Homogeneous–Charge Compression–Ignition (HCCI) Engines", SAE Technical Paper No. 892068, Sep. 25–28, 1989.

(List continued on next page.)

*Primary Examiner*—John Kwon
(74) *Attorney, Agent, or Firm*—Nixon Peabody LLP; Tim L. Brackett, Jr.

(57) ABSTRACT

A novel and improved engine and method are provided which includes a premixed charge compression ignition engine capable of operating over a wide load range without the need to vary the IMT beyond easily achievable or desirable temperature levels. The engine and method adjust the start of combustion by adjusting the engine speed and torque while delivering a targeted engine horsepower output.

18 Claims, 2 Drawing Sheets

OTHER PUBLICATIONS

Song–Charng Kong et al., "Modeling Combustion in Compression Ignition Homogeneous Charge Engines", SAE Technical Paper No. 920512, (1992).

Norimasa Iida, "Combustion Analysis of Methanol–Fueled Active Thermo–Atmosphere Combustion (ATAC) Engine Using a Spectroscopic Observation", SAE Technical Paper No. 940684, Feb. 28–Mar. 3, 1994.

Jun Harada et al., "Development of Direct Injection Gasoline Engine", SAE Technical Paper No. 970540, Feb. 24–27, 1997.

Norimasa Iida, "Alternative Fuels and Homogeneous Charge Compression Ignition Combustion Technology", SAE Technical Paper No. 972071, (1997).

Magnus Christensen et al., "Homogeneous Charge Compression Ignition (HCCI) Using Isooctane, Ethanol and Natural Gas—A Comparison with Spark Ignition Operation", SAE Technical Paper No. 972874, Oct. 13–16, 1997.

Yasushi Mase et al., "Nissan's New Multivalve DI Diesel Engine Series", SAE Technical Paper No. 981039, (1998).

J. Ray Smith, et al., "Homogeneous Diesel Combustion", Jun. 18, 1996, pp. 1–4.

"Clean Heavy–Duty Diesel Engine–II Program—Homogeneous Charge Compression Ignition (HCCI) of Diesel Fuel", SWRI Project No. 03–7479, Southwest Research Institute, Nov. 1997.

* cited by examiner

PREMIXED CHARGE COMPRESSION IGNITION ENGINE WITH VARIABLE SPEED SOC CONTROL AND METHOD OF OPERATION

TECHNICAL FIELD

This invention relates generally to an internal combustion engine capable of operating in a premixed charge compression ignition mode while effectively controlling the start of combustion.

BACKGROUND OF THE INVENTION

For well over 75 years the internal combustion engine has been mankind's primary source of motive power. It would be difficult to overstate its importance or the engineering effort expended in seeking its perfection. So mature and well understood is the art of internal combustion engine design that most so called "new" engine designs are merely designs made up of choices among a variety of known alternatives. For example, an improved output torque curve can easily be achieved by sacrificing engine fuel economy. Emissions abatement or improved reliability can also be achieved with an increase in cost. Still other objectives can be achieved such as increased power and reduced size and/or weight but normally at a sacrifice of both fuel efficiency and low cost.

The challenge to contemporary designers has been significantly increased by the need to respond to governmentally mandated emissions abatement standards while maintaining or improving fuel efficiency. In view of the mature nature of engine design, it is extremely difficult to extract both improved engine performance and emissions abatement from further innovations of the basic engine designs commercially available today. Yet the need for such innovations has never been greater in view of the series of escalating emissions standards mandated for the future by the United States government and other countries. Attempts to meet these standards include some designers looking for a completely new engine design.

Traditionally, there have been two primary forms of reciprocating piston or rotary internal combustion engines: diesel and spark ignition engines. While these engine types have similar architecture and mechanical workings, each has distinct operating properties which are vastly different from each other. Diesel and spark ignited engines effectively control the start of combustion (SOC) using simple, yet distinct means. The diesel engine controls the SOC by the timing of fuel injection. In a spark ignited engine, the SOC is controlled by the spark timing. As a result, there are important differences in the advantages and disadvantages of diesel and spark-ignited engines. The major advantage that a spark-ignited natural gas, or gasoline, engine has over a diesel engine is the ability to achieve extremely low NOx and particulate emissions levels. The major advantage that diesel engines have over premixed charge spark ignited engines (such as passenger car gasoline engines and lean burn natural gas engines) is higher thermal efficiency. One key reason for the higher efficiency of diesel engines is the ability to use higher compression ratios than premixed charge spark ignited engines (the compression ratio in premixed charge spark ignited engines has to be kept relatively low to avoid knock). A second key reason for the higher efficiency of diesel engines lies in the ability to control the diesel engine's power output without a throttle. This eliminates the throttling losses of premixed charge spark ignited engines and results in significantly higher efficiency at part load for diesel engines. Typical diesel engines, however, cannot achieve the very low NOx and particulate emissions levels which are possible with premixed charge spark ignited engines. Due to the mixing controlled nature of diesel combustion a large fraction of the fuel exists at a very fuel rich equivalence ratio which is known to lead to particulate emissions. Premixed charge spark ignited engines, on the other hand, have nearly homogeneous air fuel mixtures which tend to be either lean or close to stoichiometric, resulting in very low particulate emissions. Another consideration is that the mixing controlled combustion in diesel engines occurs when the fuel and air exist at a near stoichiometric equivalence ratio which leads to high temperatures. The high temperatures, in turn, cause high NOx emissions. Lean burn premixed charge spark ignited engines, on the other hand, burn their fuel at much leaner equivalence ratios which results in significantly lower temperatures leading to much lower NOx emissions. Stoichiometric premixed charge spark ignited engines, on the other hand, have high NOx emissions due to the high flame temperatures resulting from stoichiometric combustion. However, the virtually oxygen free exhaust allows the NOx emissions to be reduced to very low levels with a three-way catalyst.

Relatively recently, some engine designers have directed their efforts to another type of engine which utilizes premixed charge compression ignition (PCCI) or homogeneous charge compression ignition (HCCI), hereinafter collectively referred to as PCCI. Engines operating on PCCI principles rely on autoignition of a relatively well premixed fuel/air mixture to initiate combustion. Importantly, the fuel and air are mixed upstream of the cylinder, e.g., in the intake port, or in the cylinder, long before ignition occurs. The extent of the mixture may be varied depending on the combustion characteristics desired. Some engines are designed and/or operated to ensure the fuel and air are mixed into a homogeneous, or nearly homogeneous, state. Also, an engine may be specifically designed and/or operated to create a somewhat less homogeneous charge having a small degree of stratification. In both instances, the mixture exists in a premixed state well before ignition occurs and is compressed until the mixture autoignites. Thus, PCCI combustion is characterized in that: 1) the vast majority of the fuel is sufficiently premixed with the air to form a combustible mixture throughout the charge by the time of ignition; and 2) ignition, that is, the very onset or start of combustion, is initiated by compression ignition. Unlike a diesel engine, the timing of the fuel delivery, for example the timing of injection, in a PCCI engine does not strongly affect the timing of ignition. Preferably, PCCI combustion is characterized in that most of the mixture is significantly leaner than stoichiometric to advantageously reduce emissions, unlike the typical diesel engine cycle in which a large portion, or all, of the mixture exists in a rich state during combustion.

Because an engine operating on PCCI combustion principles has the potential for providing the excellent fuel economy of the diesel engine while providing NOx and particulate emissions levels that are much lower than that of current spark-ignited engine, it has also recently been the subject of extensive research and development. U.S. Pat. Nos. 4,768,481; 5,535,716; and 5,832,880 all disclose engines and methods for controlling PCCI combustion in engines. Researchers have used various other names in referencing PCCI combustion including homogeneous charge compression ignition (HCCI) as well as others such as "ATAC" which stands for "Active Thermo-Atmosphere Combustion." (SAE Technical Paper No. 790501, Feb.

26–Mar. 2, 1979), "TS" which stands for "Toyota-Soken" (SAE Technical Paper No. 790840, Sep. 10–13, 1979), and "CIHC" which stands for "compression-ignited homogeneous charge" (SAE Paper No. 830264, 1983). All of these terms are hereinafter collectively referred to as PCCI.

Although PCCI combustion may result in improved fuel economy and substantially reduced emissions, it is difficult for an engine to operate in a PCCI mode over a wide range of operating conditions, ranging from cold start-up to various levels of engine load. For example, SAE Technical Paper No. 790501 reports that PCCI combustion (ATAC) could be made to occur in a two-stroke engine at low load over a wide speed range. To attain PCCI combustion, the following conditions were found to be important. The quantity of mixture and the air/fuel ratio supplied to the cylinder must be uniform from cycle to cycle. The scavenging "directivity" and velocity must have cyclic regularity to ensure the correct condition of the residual gases remaining in the cylinder. The temperature of the combustion chamber walls must be suitable. The scavenging passage inlet must be located at the bottom of the crankcase. It was found that at very light loads, PCCI was not successful because charge temperatures were too low. At very high loads, PCCI was not successful because the residual gas quantity was too low. In between these regions, PCCI combustion was successful.

As a result, research has been directed to an engine capable of operating in multiple combustion modes. For example, SAE Technical Paper No. 892068, entitled "Homogeneous-Charge Compression Ignition (HCCI) Engines", Thring, R., Sep. 25, 1989, investigated PCCI operation of a four-stroke engine. The paper suggests an engine that would operate in a conventional spark-ignition mode at start-up and at high loads, but in a PCCI mode at part-load and idle. Others have produced two-stroke motorcycle engines which successfully use a spark to initiate combustion upon starting the engine, at the lowest load conditions, such as idling, and at high loads while operating in a PCCI mode during a low to mid-load range. SAE papers 920512 and 972874 are noted for disclosing experimental results comparing PCCI combustion to spark-ignition combustion. German Patent No. 198 18 596 also discloses a process of operating an engine in a PCCI mode at least low loads and in a spark-ignition mode at high loads.

Given the benefits of reduced emissions and improved fuel economy when operating in the PCCI mode, others have focused on practical solutions for stabilizing PCCI operation throughout changing engine conditions. Patent application Ser. No. 09/255,780 filed on Feb. 23, 1999 (published as International Patent Application No. PCT/US99/03289), currently assigned to the Assignee of the present invention, discloses an engine and method of operation which includes various control features for more effectively controlling the start of combustion. The application recognizes the ability to control in-cylinder temperature by controlling IMT thereby effectively controlling the start and/or duration of combustion. Moreover, the application recognizes that it is possible to advance the combustion event by reducing the engine speed, and to retard the combustion event by increasing the engine speed.

Still, there is a need for an engine, and method of engine operation, which includes more effectively and more efficiently operating in a PCCI mode, including simple, effective control of the start of combustion.

SUMMARY OF THE INVENTION

A general object of the subject invention is to overcome the deficiencies of the prior art and to provide a practical engine and a method for operating the engine in a premixed charge compression ignition mode while minimizing the need to vary IMT.

Another object of the present invention is to provide a PCCI engine capable of controlling SOC throughout engine load changing conditions.

Yet another object of the present invention is to provide a PCCI engine capable of more rapidly and smoothly controlling SOC.

Still another object of the present invention is to provide a PCCI engine capable of operating over a wider range of loads without the need to adjust IMT to undesirable levels or levels difficult to achieve.

A further object of the present invention is to provide a PCCI engine capable of achieving more efficient operation in hybrid and power generations applications.

A further object of the present invention is to provide a PCCI engine capable of achieving more efficient operation in conjunction with a continuously variable transmission.

A further object of the present invention is to provide a PCCI engine capable of operating on a single fuel throughout operation.

A still further object of the present invention is to provide a PCCI engine capable of minimizing emissions and avoiding very heavy, destructive knock and misfire.

The above objects and others are achieved by providing an internal combustion engine operable in a premixed charge compression ignition mode at an engine speed and an engine torque corresponding to an engine horsepower output, comprising an engine body, a combustion chamber formed in the engine body, an intake air system for delivering intake air to the combustion chamber, and a fuel delivery system mounted on the engine body to delivery to at least one of the intake air system and the combustion chamber, wherein the supply fuel and the intake air forms a premixed charge. The engine further includes a control system adapted to adjust the engine torque and adjust the engine speed when the engine is operating in the premixed charge compression ignition mode to vary a timing of a start of combustion of the premixed charge while delivering a targeted, e.g. requested or desired, engine horsepower output.

The engine may further include a combustion sensor connected to control system for sensing the start of combustion and generating a start of combustion signal, wherein the control system adapted to control a start of combustion based on the start of combustion signal. The engine may further include a turbocharger. The fuel delivery system may supply only a single type of fuel to the engine or more than one type of fuel. The control system may be further adapted to cause the fuel delivery system to deliver a post-ignition injection of fuel into the combustion chamber after the start of combustion of the premixed charge in the combustion chamber when in the premixed charge compression ignition mode. The fuel may be one of diesel fuel, kerosene, gasoline, natural gas, hydrogen and propane. The engine may further include an engine torque control system controlled by the control system to increase the engine torque to advance the start of combustion. The control system may be adapted to control the fuel delivery system to adjust a quantity of the fuel delivered to one of the intake air system and the combustion chamber.

The present invention is also directed to a method of operating an internal combustion engine in a premixed charge compression ignition mode at an engine speed and an engine torque corresponding to an engine horsepower output, comprising the steps of providing intake air to a combustion chamber and delivering fuel to at least one of the intake air system and the combustion chamber, where the fuel and the intake air form a premixed charge. The method further includes adjusting the engine speed and adjusting the engine torque when the engine is operating in the premixed charge compression ignition mode to vary a timing of a start of combustion of the premixed charge while delivering a targeted, e.g., requested or desired, engine horsepower output.

DETAILED DESCRIPTION OF THE INVENTION

Figure 1:
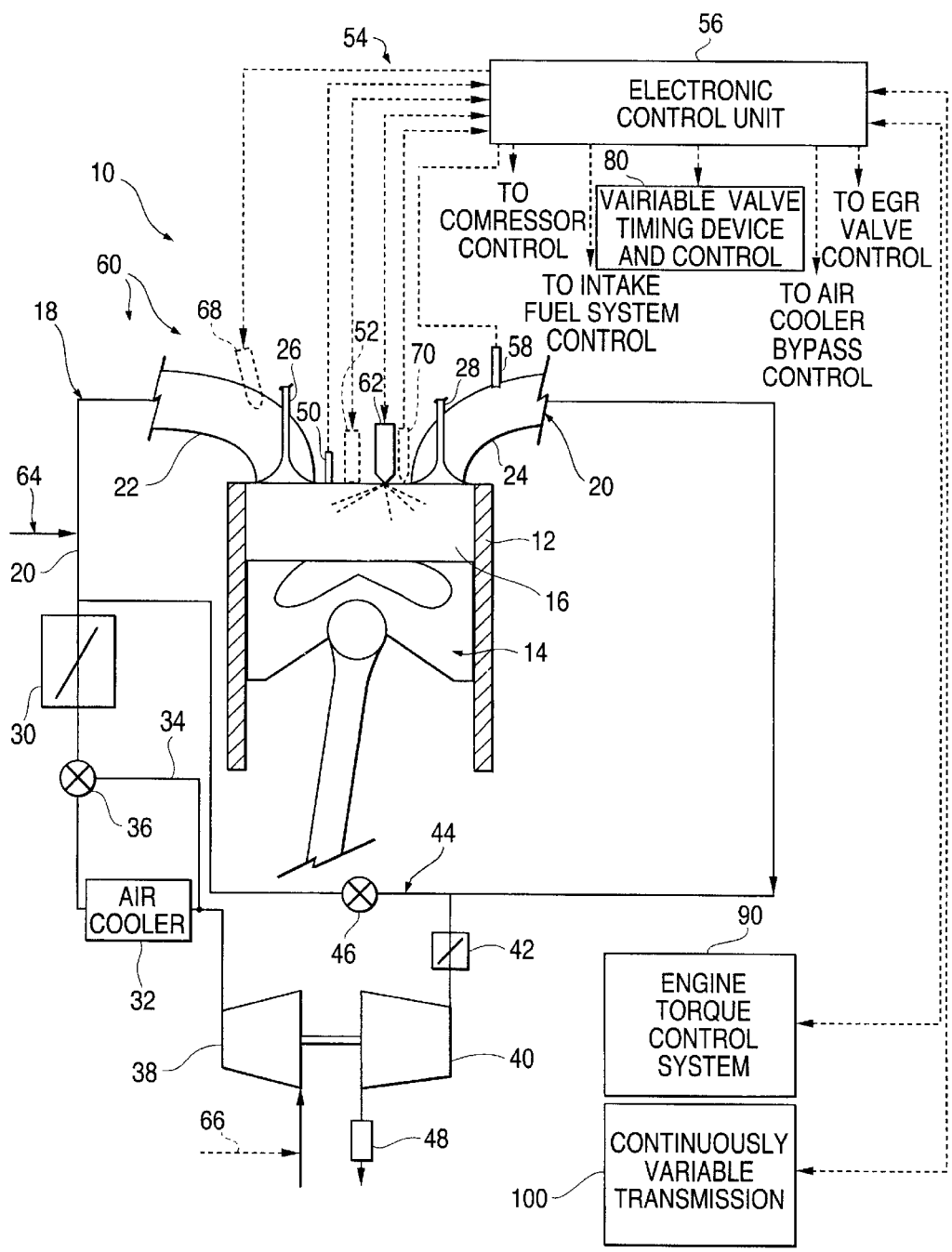
FIG. 1 is a schematic diagram of one embodiment of the present invention showing a single cylinder of the engine and associated control system.

The present invention, as further described hereinbelow, is directed to an improved internal combustion engine, and method of operating the engine, which includes effectively and efficiently controlling the start of combustion while operating in a premixed charge compression ignition mode. Importantly, the engine and method of the present invention is capable of effectively controlling the start of a combustion event by varying engine speed and torque while delivering a targeted, e.g., requested or desired, engine horsepower output. Specifically, the engine of the present invention, as generally indicated at 10 in FIG. 1, is preferably operated in a premixed charge compression ignition (PCCI) mode at most engine operating conditions. However, it is recognized that under certain conditions, such as during cold starting and high engine loads, the engine may be operated in one or more other modes, such as a diesel mode or a liquid or electric spark ignition (LSI or SI) mode, to enhance startability and load handling. The operation of the present invention in other modes and transitioning between the modes is filly described in co-pending U.S. patent application entitled "Multiple Operating Mode Engine and Method of Operation" filed on the same date as the present application and the entire contents of which is hereby incorporated by reference. A PCCI mode of operation refers to a combustion event wherein: 1) the majority of fuel is sufficiently mixed with air to form a combustible mixture throughout the charge at the time of ignition; and 2) ignition (start of combustion) is initiated by compression ignition, which includes homogeneous charge compression ignition (HCCI) engines. It should be noted that the term PCCI as used herein does not exclude the use of ignition timing mechanisms such as pilot injections and spark ignition to precisely time the start of combustion of a premixed charge where the vast majority of the premixed charge will burn by compression ignition without the presence of a self-sustaining propagating flame front such as in a spark ignited engine. This allows a PCCI engine to combust a mixture that is too lean to support a self-sustaining flame front thereby allowing a premixed charge leaner than is possible in a spark ignited engine. It should also be initially noted that the present invention may be applied to various types of internal combustion engines that combust various fuels including, but not limited to, natural gas, gasoline, propane, diesel, hydrogen, kerosene, naphtha and/or other fuels.

Referring to FIG. 1, there is shown an exemplary embodiment of the engine 10 including an engine body 12 with a piston assembly 14 reciprocally mounted therein. Piston assembly 14 and engine body 12 forms a combustion chamber 16 in a manner well known in the art. Engine 10 also includes an intake system 18 for delivering intake air or a combination of intake air and fuel to combustion chamber 16 and an exhaust system 20 for removing exhaust gas from combustion chamber 16. It should be noted that although only one cylinder is illustrated in FIG. 1, the present invention may be utilized in internal combustion engines of various configurations including engines having any number of cylinders, for example, four, five, six, eight, ten, twelve or sixteen cylinders. In addition, although the present multi-mode engine is primarily discussed with reference to a four-stroke engine, the present control system and engine may be in the form of a two-stroke engine.

Intake system 18 includes an intake manifold 20 and an intake port 22 for directing intake air or an air/fuel mixture into combustion chamber 16. Likewise, exhaust system 20 includes an exhaust port 24 for directing exhaust gas as described hereinbelow. One or more intake valves, such as intake valve 26, and one or more exhaust valves, such as exhaust valve 28, are positioned in the respective ports and moved between open and closed positions by a conventional valve control system, or a variable valve timing system, to control the flow of intake air or air/fuel mixture into, and exhaust gases out of, the cylinder, respectively. Intake system 18 may further include a throttle 30 for controlling intake manifold pressure and thus intake air, or air/fuel mixture, flow through intake system 18. An air cooler 32 may also be provided to control the temperature of the intake air or air/fuel mixture. An air cooler bypass circuit 34 and bypass valve 36 may be provided to more effectively control the quantity of air or air/fuel mixture flow through air cooler 32 thereby permitting more control over the temperature of the intake flow. A compressor 38 may be provided along intake air system 18 upstream of intake manifold 20 and air cooler 32 for varying boost intake pressure. Compressor 38 may be driven by any conventional means, such as an exhaust gas driven turbine 40. An exhaust restriction or throttle 42 may be positioned upstream of exhaust turbine 40 to permit greater control over the combustion process, e.g. controlling the residual mass fraction to control the SOC. Although not shown, a waste gate valve may also be provided in a conventional manner to regulate the amount of exhaust gas applied to turbine 40 thereby varying the intake pressure as desired. Another possible way to control intake temperature and thus SOC is by using hot exhaust gas recirculation (EGR). An EGR circuit 44 may be used to direct hot exhaust gas from upstream of turbine 40 into intake system 18. EGR circuit 44 includes an EGR control valve 46 for controlling the recirculation of exhaust gas. Exhaust system 20 may also be provided with an oxidation catalyst 48 for treating the exhaust gas. Engine 10 preferably includes a combustion sensor 50 for sensing a combustion characteristic, such as cylinder pressure, and generating a signal corresponding to the combustion characteristic. Preferably, a cylinder pressure sensor is provided on any or all engine cylinders for sensing, on a cycle-by-cycle basis, the SOC. Of course, combustion sensor 50 may also provide other combustion data, such as combustion rate, combustion duration, crank angle at which peak cylinder pressure occurs, combustion event or heat release location and end of combustion data, any one of which may be used instead of the start of combustion data to effectively control combustion. While in the present embodiment, the sensor 50 that provides a pressure data signal is a pressure sensor, other sensors may also be used that provide a signal indicative of cylinder pressure such as through use of correlating pressure data. Such sensors include accelerometers, ion probes, optical diagnostics, strain gages, load washers, and/or fast thermocouples in or near the cylinder head, liner or piston. Also, torque or RPM sensors could be used to detect changes in engine torque and RPM associated with each combustion event. In one embodiment, the engine may also be provided with a spark plug 52 for operating in an electronic spark ignition mode.

Engine 10 also includes a control system indicated generally at 54 which includes an electronic control unit (ECU) 56 designed to receive one or more engine condition signals from various engine components as shown in FIG. 1, such as combustion sensor 50 and an engine position sensor (not shown), process the signals and provide control signals to the appropriate engine components to effectively control combustion, for example the start of combustion. In the preferred embodiment of an alternator/generator application of the present invention discussed hereinbelow, control system 54 includes a torque control system 90 for varying current so as to adjust engine torque. When torque control system 90 is used control the start of combustion while delivering a targeted horsepower output, the engine speed is automatically adjusted thereby controlling the start of combustion as described hereinbelow to limit, and possibly avoid, the need to vary intake manifold temperature (IMT) by controlling engine components affecting IMT, such as air cooler bypass 36 or EGR valve 46. That is, the resulting IMT may be acceptable without any further control or it may be desirable to control the IMT to achieve improved engine performance. In a hybrid engine application for a vehicle, control system 54 includes a continuously variable transmission 100 for controlling engine speed and permitting differences in speed between the engine shaft and an output shaft. The torque in such an embodiment is varied by control system 54 controlling a fuel delivery system in a manner to adjust the amount of fuel delivered to the engine per engine cycle. Of course, in alternative embodiments, electronic control unit 56 may control one or more of a temperature control system for varying the temperature of the intake air or a mixture of fuel and intake air, a pressure control system for varying the pressure of the mixture, the equivalence ratio control system for varying an equivalence ratio of the mixture and a mixture autoignition property control system for varying an autoignition property of the mixture so as to achieve more effective and/or more rapid control of the SOC. The specific details of variably controlling components associated with a combustion control system has been discussed in patent application Ser. No. 09/255,780 filed on Feb. 23, 1999, currently assigned to the assignee of the present invention and published as international patent application No. PCT/US99/03289, the entire contents of which is hereby incorporated by reference. It should be noted that the inventions of the present application may be used with either closed-loop control of PCCI combustion or open loop control depending on the application and controllability. It should be understood that the multi-mode engine of the present invention may include one or more of the aforementioned control system components to effectively control combustion. In the present engine as illustrated, ECU 56 may control air cooler bypass valve 36, EGR valve 46, a variable valve timing system 80, and/or various fuel delivery/injection components described more fully hereinbelow. ECU 56 may also control throttle 30 and exhaust restriction 42. ECU 56 may also receive signals from an exhaust sensor 58 which assists in determining the quality of combustion or the start of combustion by measuring, and providing signals relating to, carbon monoxide, oxygen, oxides of nitrogen, unburned hydrocarbons (UHC), water and/or carbon dioxide. The features shown in dashed lines in FIG. 1 are not part of the preferred embodiment, but one or more of these components could be included to form alternative embodiments and to assist in controlling combustion.

Engine 10 further includes a fuel delivery system indicated generally at 60 including, in the preferred embodiment, a direct fuel injector 62 for injecting high pressure fuel into combustion chamber 16 at the appropriate time during the engine cycle to achieve the desired effect. For example, direct injector 62 may be used to inject fuel, i.e. diesel full, near top dead center position to achieve diesel combustion when operating in a diesel mode, inject an early diesel pilot quantity when operating in a PCCI mode to, for example, assist in controlling the timing of the start of combustion without initiating combustion at the time of injection, injecting a pilot quantity of fuel during an LSI mode and/or injecting fuel early in the engine cycle to create a premixed charge when the engine is using only a single fuel and injector to achieve PCCI operation. In the preferred embodiment, fuel delivery system 60 also includes an upstream fuel supply delivered into intake system 18. Preferably, the fuel supply is introduced into intake manifold 20 at 64 by a mixer or carburetor to allow the fuel to premix with the air sufficient for premixed charge compression ignition and, if desired, spark ignition, modes. Alternatively, the upstream fuel supply may be introduced upstream of compressor 38 at 66 or into intake port 22 via a port injector 68. Also, alternatively, a second direct injector 70 may be utilized for directly injecting a fuel different from the fuel injected by direct injector 62. For example, in an embodiment utilizing direct injector 62 and direct injector 70, direct injector 62 may inject diesel fuel for diesel mode, early diesel pilot, post-ignition injections while direct injector 70 injects a gaseous fuel, such as natural gas, for premixed charge compression ignition mode and transition modes. Alternatively, direct injector 62 and direct injector 70 may be combined into a single injector capable of injecting the two different fuels. Each of the fuel delivery devices discussed above are preferably controlled electronically by ECU 56 for controlling the timing and quantity of a particular fuel injection.

Further details regarding the use and implementation of an early diesel pilot are set forth in detail in co-pending patent application entitled "Internal Combustion Engine Operable in PCCI Mode with Post-Ignition Injection and Method of Operation" filed on the same date as the present application and the entire contents of which is hereby incorporated by reference. The details of the use and implementation of a post-ignition injection to reduce emissions are disclosed in co-pending application entitled "Internal Combustion Engine Operable in PCCI Mode with Post-Ignition Injection and Method of Operation" filed on the same day as the present application and the entire contents of which is hereby incorporated by reference.

Figure 2:
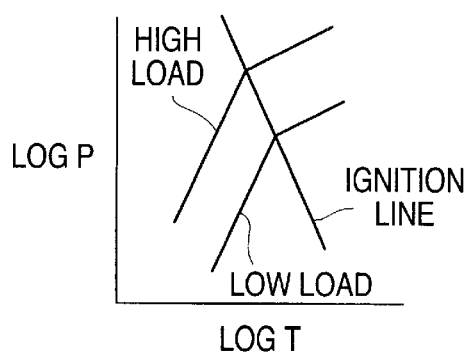
FIG. 2 is a graph showing the effects of varying load in terms of pressure versus temperature relative to an ignition line.
Figure 3:
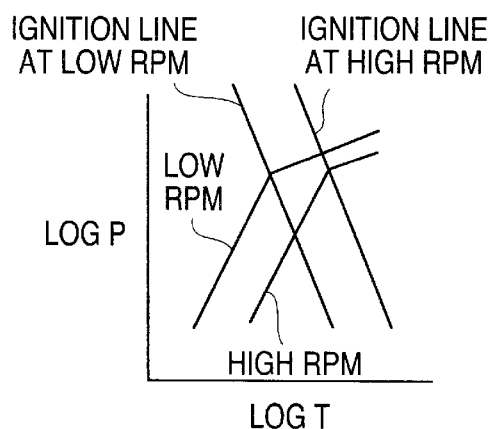
FIG. 3 is a graph showing the effects of varying engine speed in terms of pressure versus temperature relative to ignition lines at different speeds.
Figure 4:
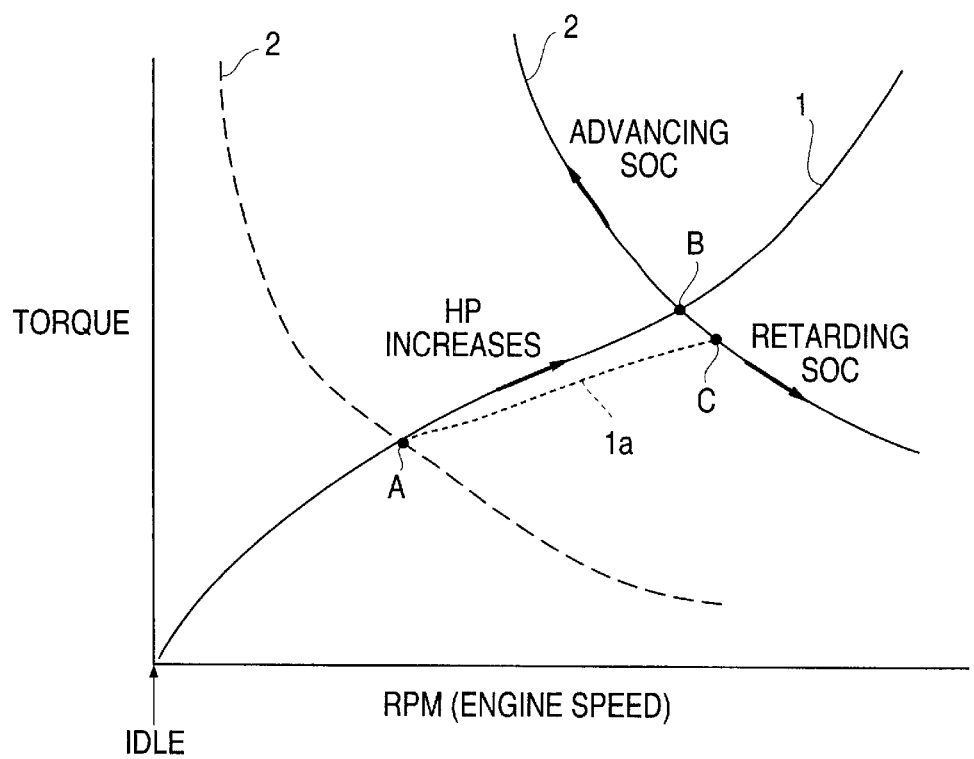
FIG. 4 is a graph showing engine torque as a function of engine speed.

Applicants have recognized that as the load increases when operating in the PCCI mode, the IMT required to maintain a satisfactory timing of the start of combustion, decreases as clearly shown in FIG. 2. For an engine with a fixed compression ratio, significantly higher intake manifold temperatures are thus required at low loads. Referring to FIG. 3, applicants have also observed that as engine speed (rpm) increases, the intake temperature required to maintain a similar start of combustion, increases. This requirement for low IMT at high load, low engine speed conditions, and high IMT at low load, high engine speed conditions, presents a significant challenge in varying IMT across a broad temperature range. Alternatively, the present invention proposes the use of a system and method which requires little or no control over IMT during PCCI mode operation. Specifically, the present invention allows the engine to control SOC as the load demand varies by operating the engine at different speeds. As a result, the present engine and method advantageously permits operation at a relatively constant IMT, or at an IMT that is particularly convenient, e.g. an IMT that results from no charge air cooling. Referring to FIG. 4, the engine operates over a range/map, for example, as shown. Line 1 represents the operation condition yielding optimum engine performance in terms of emissions and engine efficiency. Therefore, for each horsepower value/output along line 1, there is a preferred combination of speed and torque, stored in ECU 56, that will result in the desired SOC necessary for optimum engine performance utilizing the easily achievable (desired) IMT. Thus, line 1 represents different horsepower outputs at the desired, achievable or available IMT. Line 2, on the other hand, is a line of constant horsepower where torque×rpm=constant. Of course, for each horsepower there is a different unique line of constant horsepower similar to line 2 but positioned at a different horsepower value along line 1. Thus, if the timing of SOC is undesirably retarded at a given torque/speed point, ECU 56 will control the engine to cause movement along the constant horsepower line 2 to advance SOC as needed without changing the power output as described in the example hereinbelow.

During operation, given a system request for a certain increase in shaft horsepower, the ECU 56 controls the engine to create a response moving up along line 1 from point A to desired operating point B. This control could be accomplished on a hybrid engine by increasing the torque using, for example, a torque control system 90 to increase the field current on an AC alternator (or the field current and armature current of a DC generator) while simultaneously increasing the amount of fuel delivered to the engine per engine cycle. Under optimum conditions, a new set point for the engine torque (field current) and the fueling rate would result in the optimum SOC timing and the desired horsepower would be achieved. Of course, the continuous change in engine speed could also be obtained through the use of a continuously variable transmission. A request for a decrease in shaft horsepower would likewise ideally move along line 1 from point B to the desired operating point A. However, variations in any parameter that affects the SOC (e.g., IMT, fuel quality, compression ratio variations, humidity variations, etc.) will cause the engine speed/torque to deviate from the optimum line 1 in response to the request for a horsepower change. For example, if the ambient temperature were considerably lower than nominal conditions, this would result in a delay in SOC and a subsequent reduction in torque for a fixed alternator field current, rpm, and fueling rate. Under these circumstances, the request for additional horsepower would result in the engine moving along line Ia from initial point A to less desirable point C. To achieve the desired horsepower at the fixed field current setting, the engine would have to run at a higher engine speed at the cost of increasing the fueling rate (therefore lowering the engine efficiency).

The present invention provides a system and method by which, at a fixed engine shaft horsepower, the engine ECU 56 can return the engine to the optimum operating point (or as close to the optimum operating point as possible) by varying torque and rpm simultaneously or nearly simultaneously to adjust SOC. In doing so, ECU 56 would move engine operation along the line of constant shaft horsepower shown by line 2 in FIG. 4. For example, ECU 56 would cause engine operation to move from point C to the optimum point B by simultaneously decreasing the engine speed and increasing the engine torque. On a hybrid engine, for example, torque control system 90 can be used to increase the field current on the alternator while simultaneously adjusting the fueling rate to affect this transition. In other applications, such as vehicular, continuously variable transmission (CVT) 100 may be used to permit variations in engine speed while providing the appropriate output shaft rpm. The CVT would be controlled by ECU 56 to adjust the engine speed while ECU 56 would control adjust engine speed by varying fuel quantity delivered per engine cycle by controlling one of more of the fuel delivery devices. In either embodiment, the feedback signals to ECU 56 would include shaft horsepower and the location of SOC, as, for example, determined by combustion sensor 50. ECU 56 would compare the actual SOC to the desired SOC and recognize the discrepancy. ECU 56 would then generate appropriate control signals to appropriate engine components, such as engine torque control system 90, to create the desired increase or decrease in the engine torque, by, for example, changing the field current in a hybrid engine. As a result, engine rpm would subsequently decrease or increase. The change in engine speed and torque would then change SOC and subsequently change the shaft horsepower. ECU 56 would then issue the appropriate control signals to the appropriate fuel delivery device(s) to adjust the fueling rate to correctly maintain engine horsepower. By making small and quick corrections, this control scheme will yield adjustment of the SOC at essentially a constant horsepower or while delivering a targeted, e.g., requested or desired, engine horsepower output. The result of decreasing engine speed and increasing engine torque will result in the desired advancement of SOC to (or near to) the optimum set point. Of course, ECU 56 may be designed to simultaneously adjust the torque demand (e.g. field current) and fueling rate to affect a more rapid and smooth adjustment. Importantly, this transition may be made without auxiliary devices to change IMT, compression ratio, or shift the ignition line by changing the characteristics of the fuel/air mixture prior to combustion, such as by using an early diesel pilot injection. However, it may be advantageous to utilize the present speed based control strategy in conjunction with one or more of the SOC control devices, described in the co-pending applications mentioned hereinabove and incorporated by reference, to affect more rapid changes and/or achieve results closer to the optimum set point. Thus, it can be seen that this invention permits a PCCI engine to operate over a wide load range without the need to force the IMT to temperatures that are far away from an easily achievable or desirable IMT. Of course, it should be understood that under certain conditions it may desirable to operate the engine at a torque/speed combination that is away from line 1 in FIG. 4. Such situations could include sudden transients or the need to meet a particular demand of the overall system.

It should be noted that line 1 of FIG. 4 may itself vary in position depending on the operating history of the engine, such as the length of time the engine has been at a given load, the coolant temperature and/or the ambient temperature. In addition, the engine would most likely operate at an equivalence ratio that is relatively constant at a given torque and speed and with no need for throttling at any but the highest loads. It should be noted that as the required horsepower changes, the desirable IMT may be affected by various components, including the turbo machinery or air handling equipment. If the engine is equipped with a turbocharger, line 1 may be dictated mostly by the turbocharger's ability to create the necessary boost. In this case, the intake air temperature could be controlled with heat exchangers, heaters, coolers or by adding EGR, or the amount of internal EGR could be varied to control SOC. One application would be to run the engine unthrottled with the turbocharger providing a predetermined amount of boost at a desired equivalence ratio. As the engine speed increases, the boost increases. This increase will define the position of line 1 and other means may be used to control SOC as discussed hereinabove.

INDUSTRIAL APPLICABILITY

The present PCCI engine and control system may be used in any stationary or nonstationary power plant, including any automotive, industrial, marine or military application. The present PCCI engine and control system is especially advantageous in any power generation application where low emissions are desirable and hybrid applications where engine speed can be varied to meet a particular horsepower requirement.

We claim:

1. An internal combustion engine operable in a premixed charge compression ignition mode at an engine speed and an engine torque corresponding to an engine horsepower output, comprising:

an engine body;

a combustion chamber formed in the engine body;

an intake air system for delivering intake air to said combustion chamber;

a fuel delivery system mounted on said engine body to delivery to at least one of said intake air system and said combustion chamber, said supply fuel and said intake air forming a premixed charge; and a control system adapted to adjust the engine and adjust the engine speed when the engine is operating in the premixed charge compression ignition mode to vary a timing of a start of combustion of the premixed charge while delivering a targeted engine horsepower output.

2. The engine of claim 1, further including a combustion sensor connected to said control system for sensing the start of combustion and generating a start of combustion signal, said control system adapted to control a start of combustion based on said start of combustion signal.

3. The engine of claim 1, further including a turbocharger.

4. The engine of claim 1, wherein said fuel delivery system supplies only a single type of fuel to the engine.

5. The engine of claim 1, wherein said control system is further adapted to cause said fuel delivery system to deliver a post-ignition injection of fuel into said combustion chamber after the start of combustion of the premixed charge in said combustion chamber when in said premixed charge compression ignition mode.

6. The engine of claim 1, wherein said fuel is one of diesel fuel, kerosene, gasoline, natural gas, hydrogen and propane.

7. The engine of claim 1, further including an engine torque control system, said control system further adapted to cause said engine torque control system to increase the engine torque to advance the start of combustion.

8. The engine of claim 1, wherein said control system is further adapted to control said fuel delivery system to adjust a quantity of said fuel delivered to one of said intake air system and said combustion chamber.

9. The engine of claim 1, wherein said control system is adapted to adjust the engine torque and adjust the engine speed to maintain engine horsepower output substantially constant.

10. A method of operating an internal combustion engine in a premixed charge compression ignition mode at an engine speed and an engine torque corresponding to an engine horsepower output, comprising the steps of:

providing intake air to a combustion chamber;

delivering fuel to at least one of said intake air system and said combustion chamber, said fuel and said intake air forming a premixed charge; and adjusting the engine speed and adjusting the engine torque when the engine is operating in the premixed charge compression ignition mode to vary a timing of a start of combustion of the premixed charge while delivering a desired engine horsepower output.

11. The method of claim 10, wherein the engine uses only a single fuel.

12. The method of claim 11, wherein said single fuel is diesel fuel.

13. The method of claim 10, further including the step of adjusting a quantity of said fuel delivered to one of said intake air system and said combustion chamber.

14. The method of claim 13, wherein the steps of adjusting the engine torque and adjusting the quantity of said fuel per engine cycle are performed at least nearly simultaneously.

15. The method of claim 10, further including the step of increasing engine torque to advance the start of combustion.

16. The method of claim 10, further including the steps of sensing the start of combustion, generating a start of combustion signal and controlling the start of combustion based on said start of combustion signal.

17. The method of claim 10, further including the step of delivering a post-ignition injection of fuel into the combustion chamber of the engine after the start of combustion of the premixed charge in the combustion chamber when in said premixed charge compression ignition mode.

18. The method of claim 10, further including the steps of adjusting the engine torque and adjusting the engine speed to maintain engine horsepower output substantially constant.

* * * * *